June 17, 1941.　　W. J. HUGHES　　2,245,589
LIQUID TREATMENT (CLARIFICATION)
Filed Aug. 4, 1939
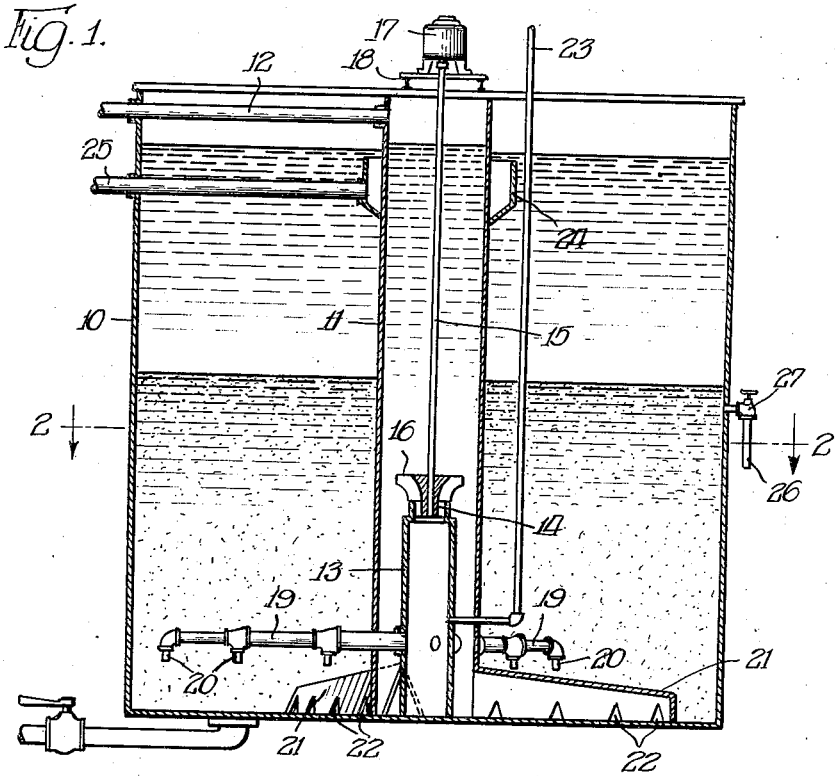
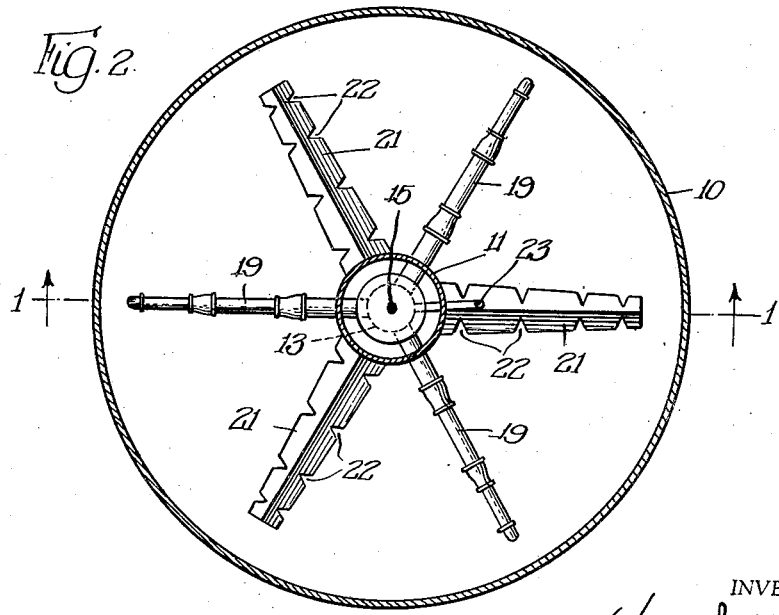
INVENTOR.

Patented June 17, 1941

2,245,589

UNITED STATES PATENT OFFICE 2,245,589

LIQUID TREATMENT (CLARIFICATION)

Walter J. Hughes, Chicago, Ill., assignor to International Filter Co., Chicago, Ill., a corporation of Delaware Application August 4, 1939, Serial No. 288,265

3 Claims. (Cl. 210—16)

The present invention relates to liquid treatment and in particular to the clarification of liquids as in treatment of turbid surface waters for municipal or industrial use, removal of color from liquids, treatment of sewage or other liquid wastes, and the like. The clarification of turbid water is illustrative and such treatment will be particularly referred to in the following. This application is a continuation in part of my copending application Serial No. 83,662, filed June 5, 1936.

Clarification may involve the removal of particles of clay or soil, mineral fragments of microscopic or ultramicroscopic size, small fibers, and other particles of small dimensions and varied physical, chemical and biological characteristics. Such minute particles of foreign matter may be present in the suspended or colloidal state, and may be objectionable on various grounds.

In addition, practically every water supply and every process liquor or waste derived therefrom contains certain dissolved substances. Still other materials can be added. This invention involves formation within or from the water containing minute particles of foreign matter, of a slurry of heavy, large and sturdy solid agglomerates comprising solid products of a chemical and physical reaction involving the dissolved substances. Furthermore, the invention provides improved separation of treated liquid from solid agglomerates so formed.

A principal object of this invention is the clarification of water containing minute particles of foreign matter by a process saving appreciable amounts of chemical reagents and producing a treated effluent of improved quality, with the use of less ground space and head room for detention of liquid and ordinarily with less expenditure of power than is required in other methods known to the art.

Another object is the clarification of turbid water by a process resulting in a filter influent of superior quality, with respect to the solid particles carried by such filter influent.

Another object is to provide a slurry containing particles precipitated in or from water to improve reactions for the removal of particles causing turbidity from the water.

A particular object is to provide a slurry comprising precipitated particles of a nature different from but suitable for the treatment of the turbid matter to be removed from the water.

Another particular object is to suitably condition and use such a slurry for the removal of substances different therefrom.

In the drawing Fig. 1 is a vertical sectional view of an apparatus suitable for carrying out my improved method, taken along line 1—1 of Fig. 2; and Fig. 2 is a horizontal sectional view, taken along line 2—2 of Fig. 1.

The apparatus includes a tank 10 which is shown as a vertical cylinder open at the top. Extending upwardly through the center of the tank is a smaller cylinder 11 the upper part of which connects with a raw water inlet pipe 12. Within the cylinder 11 there is a still smaller cylindrical compartment 13. The upper end of 13 carries spider bearing 14 in which is journaled shaft 15. This shaft carries centrifugal impeller 16 and is driven by motor 17 supported on frame structure 18 at the top of the tank. Extending outwardly from compartment 13 through the wall of cylinder 11 are a series of collecting or recirculating lines 19 having spaced pickup openings 20 which are positioned in tank 10 above the bottom thereof and outside of cylinder 11. It is preferred that pickup openings 20 be spaced in such manner as to collect liquid evenly from the various parts of the tank space outside 11 and to provide converging streams of liquid to compartment 13. Communicating with and radially extending from the bottom of cylinder 11 are a series of diverging, inverted V-shaped discharge conduits or arms 21 which are provided with discharge slots 22. The slots 22 are spaced over the area of the outer tank space in manner similar to the one described in connection with pickup openings 20 so as to produce an even discharge of liquid. Rotation of impeller 16 provides liquid head in cylinder 11 which in turn causes a current or closed cycle circulation of slurry through 11, out through 22 and back through 20. To provide for treatment with clarifying reagent a line 23 leads from outside the tank to compartment 13. Adjacent the top of the tank is mounted clear water outlet funnel 24. Outlet conduit 25 conveys clarified water from this funnel to the point of use, storage or further treatment. A slurry discharge pipe 26 provided with valve 27 is mounted in the side of tank 10 at an elevation below the top of funnel 24 and above the bottom of the tank. Suitable drains and the like can be added.

The assembly or zone formed by compartment 13, the part of cylinder 11 close to and below impeller 16, and discharge arms 21 receives turbid water from the upper part of cylinder 11 and also receives slurry and reagents from 20 and 23 respectively. Inasmuch as it is in this zone that recirculated slurry is mixed with reagents, and treatment reactions are produced by turbulently contacting the mixture with the turbid liquid, this zone will be referred to as treating, mixing or reaction chamber, or zone of turbulent agitation. A relatively turbulent flow will also be found in the lower part of tank 10, below pickup openings 20. This will be better appreciated on comparison with the portion above the pickup openings. In this part relative quiescence prevails, only so much flow velocity and agitation being ordinarily maintained therein by the flow rising above 20 as is required to maintain a suspension of the heavy slurry particles which may accumulate in this portion. This upper and outer part of tank 10 in the following will be referred to as separation chamber or zone, or zone of relative quiescence.

In operation there is a general liquid displacement or throughput from the inlet through the turbulent or mixing zone into the relatively quiescent or separating zone and upwardly through the latter to the outlet of the tank. Superimposed on this general displacement, in certain parts thereof, is the aforementioned closed cycle circulation of slurry. The circulation comprises a turbulent flow passing with the general throughput through the mixing chamber, into and through the lower portion of the outer space and back to the mixing chamber where it joins the general flow again. The circulation is provided by impeller 16 running at suitable speed, which speed is independent from the general throughput. Preferably the circulation is larger in amount than the flow of raw water. This circulation of a major quantity of the slurry effects a return of a large quantity of solids and thereby produces effective coagulation in the mixing chamber. The large return also provides for the effective maintenance of the particles in suspension adjacent the bottom of the tank by reason of the relatively high rate of flow. Due to the circulation described liquid entering the tank will pass through the treating zone more than once, desirably about five times as an average.

An initial stage of operation includes the establishment in the lower part of the tank of a pool of slurry. The slurry produced during the initial stage is thereafter maintained and used during operation. It consists of water with solid particles suspended therein, said water and solids being conditioned as hereinafter described in more detail.

Alum, ferrous sulphate, ferric chloride, sodium aluminate and practically all other coagulating reagents known to the art can be used in the present method. They can be added in the solid or liquid state or some of them may be used in the gaseous state.

As the chemicals are mixed with and dissolve in the water they react with certain substances such as hydroxides, carbonates and bicarbonates of the alkalis and alkaline earths, for instance calcium bicarbonate, which are either found in the water or are added to the same. Reaction of the iron or aluminum sulphates or other coagulants with such calcium bicarbonate or the like results in precipitation of the iron or aluminum hydroxides in the form of gelatinous flocs in suspension, while waste products such as calcium sulphate or carbon dioxide may remain in solution or escape as gas or appear as additional precipitates. The flocs so precipitated and suspended adhere to one another and to the particles of turbidity, under proper conditions of hydrogen ion concentration, etc., being naturally or artificially provided. In this manner agglomerates or weighted clusters of the turbid matter are formed. The water containing such composite clusters or weighted agglomerates passes into and through the lower part of the tank 10 at a rate and in manner to substantially maintain the initial suspension of the flocs, against sedimentation thereof.

A considerable portion of this water and of the solid agglomerates carried by the same is drawn back into the mixing chamber, where such returned medium or slurry is mixed with additional portions of clarifying reagents in compartment 13 and thereafter, with additional water to be clarified, in cylinder 11. Thereafter, the chemically unstable substances carried by the water to be clarified react with the clarifying reagent in the presence of previously formed precipitates carried by the return liquid and kept in suspension therein. By such reactions carried out in such surroundings the precipitates formed are conditioned and rendered larger, heavier and sturdier and more adapted to serve for the coagulation of particles causing turbidity. As this process continues the amount of conditioned agglomerates in the circulating liquid increases and there is formed, in the lower part of the tank 10, an accumulation of slurry containing heavy but suspended particles of solids precipitated adhering and tending to adhere to solids of turbidity.

This slurry is picked up and circulated in a rapid flow sweeping over the tank bottom in one part thereof. The turbulent agitation provided in this slurry results in frequent contacts of previously formed particles with turbid matter and newly forming particles, and also conditions the liquid by sweeping away the products of reaction from nuclei of chemically unstable matter which are not completely reacted as yet, thereby promoting further reactions.

The conditioned solids are of nature kindred to newly formed coagulating flocs, thereby facilitating agglomeration, but are different in character from the suspended and colloidal matter to be removed. A considerable portion of the molecules of new precipitates probably form deposits directly upon previously formed agglomerates contained in the circulated slurry, instead of forming separate small precipitates. By this process of accretion, precipitates are built up to a size, weight and consistency which later on facilitates clarification and which at this point permits the favorable condition of vigorous agitation within the slurry medium.

A certain amount of slurry, corresponding to the amount of liquid and reagent input, separates from the return flow picked up in the lower portion of the tank and flows upwardly through the outer tank space. In the lower tank portion the slurry is in rapid motion, entraining solids with the liquid. In the upper portion or separation zone, the rate of flow is controlled to be such that practically none of the solids formed in the reaction zone are carried up with the water. This rate is lower than the one in the mixing zone, although it is considerably higher than customary flow rates through settling zones or the like; it may even be higher than certain customary flow rates in coagulation zones of the prior art. In order to obtain the typical condition of a slurry pool in this outer zone it is desirable to provide straight, upward flow by distributing the outflow from the turbulent reaction chamber as by the spaced arrangement of openings 22 and also by distributing the withdrawal for recirculation, as by the arrangement of pickup openings 20. With proper flow conditions being established and maintained especially in the zone assigned for the upper slurry level, in the outer space of tank 10, said level will be rather well defined, marking the line of ultimate separation of clarified water from solids to be removed.

Suspended solids will accumulate, forming the slurry pool, until a limit of slurry concentration is reached beyond which there is no further increase of concentration but only an increase in depth of the slurry pool, under the particular conditions of the process. The process conditions having a bearing on this maximum concentration include the rates of throughput and circulation, the type of particles of turbidity in the water, the average number, size and weight of coagulating flocs, the temperature and other process factors. The upper level of the slurry pool is maintained at the desired elevation at or above the level of pick-up openings 20 and of course below the clear water takeoff, by withdrawing a small side stream of slurry through the blowoff line 26. If the amount of solids withdrawn is smaller than the combined amounts of precipitates formed and of particles of turbidity separated from the water the upper level of the slurry pool will rise. Conversely, withdrawal of a greater amount of solids through the blowoff will result in a fall of the upper level of the slurry pool.

It is preferred to withdraw the slurry from adjacent the top of the slurry pool. Relatively light particles may tend to accumulate at the top of the pool. Such particles are of less value as a slurry and have a tendency to be carried out with the treated water. Consequently drawoff of such particles assists in maintaining the slurry pool in good condition.

With respect to specific dimensions let it be stated in general that similar considerations will control as have been found to be valid in the case of water softening. In any event this depends on the particular type of liquid, the kind of treatment to be applied and the results to be derived. The turbulent conditions of the mixing zone can be such as would ordinarily disintegrate agglomerates formed by the reaction of clarifying reagents in turbid water. Due to the carrying out of the reaction in the presence of recirculated slurry as described there is formed a floc which allows for such turbulent conditions and which also renders possible the simple and efficient solids and liquid separation provided in the zone of relative quiescence. The character of the latter zone in turn is such that considerably less detention space and time is required than has been found to be necessary in prior apparatus. Tentatively it may be stated that in a coagulation process as here described the upward rate of rise in the relatively quiescent zone may be as high as eight inches per minute (.2 to 5 gallons per minute per square foot or 12.5 to 310 million gallons per acre per day). The size of chamber 11 should be such as to provide space wherein a thorough mixing of the liquid to be treated and the return slurry may take place and wherein at least the necessary chemical reaction may be completed in the desired time. Preferably the whole of the chemical and physical reactions is allowed to take place substantially within the turbulent zone.

Various changes may be made in the procedure described herein for purposes of illustration and explanation, without departing from the scope of the invention as stated in the appended claims.

I claim:

1. In the process for removing turbidity-imparting solids from water by treatment with a coagulant, the steps which comprise maintaining a body of water; introducing incoming water and a coagulum-forming compound into a turbulent mixing zone at least partly separated from but communicating with said body of water; passing the incoming water and coagulum-forming compound through said mixing zone to produce the formation of solid particles in said water at least in part from said coagulum-forming compound; maintaining in the lower portion of said body of water a body of slurry of water containing suspended particles formed at least in part from said coagulum and collected from previously treated water; passing a substantial volume of such slurry, convergently to and through said mixing zone; passing the slurry and incoming water from said mixing zone divergently into said body of slurry; applying substantial mechanical impelling energy to said slurry in addition to any energy imparted thereto by the incoming water and thereby producing said turbulence in the mixing zone, producing said passage of slurry, and maintaining the particles in said passing slurry in suspension; removing particles from said slurry to control the volume thereof; displacing an output quantity of clarified water upwardly from said body of slurry by the water and slurry from the mixing zone, and withdrawing clarified water from above said body of slurry.

2. In the process for removing turbidity-imparting solids from water by treatment with a coagulant, the steps which comprise maintaining a body of water; passing incoming water into and through a turbulent mixing zone at least partly separated from but communicating with said body of water; introducing into said mixing zone a precipitant from the group consisting of soluble iron and aluminum hydroxide-forming compounds; reacting said precipitant with an alkaline material in the water to form suspended particles of coagulum; maintaining in the lower portion of said body of water a body of slurry composed of water containing suspended particles of said coagulum and collected from previously treated water; passing a substantial volume of such slurry convergently to and through said mixing zone; passing the slurry and incoming water from said mixing zone divergently into said body of slurry; applying substantial mechanical propelling energy to said slurry in addition to any energy imparted thereto by the incoming water and thereby producing said turbulence in the mixing zone, producing said passage of slurry, and maintaining the particles in said passing slurry in suspension; removing particles from said slurry to control the volume thereof; displacing an output quantity of clarified water from said body of slurry by the water and slurry from the mixing zone; and withdrawing clarified water from above said body of slurry.

3. In the process for removing turbidity-imparting solids from water by treatment with a coagulant, the steps which comprise maintaining a body of water; producing in the lower portion of said body of water a body of slurry composed of water containing suspended particles of a water insoluble hydroxide from a group consisting of iron and aluminum hydroxide; establishing with said slurry a flow pattern of agitation and circulation which includes passing slurry from different parts of said body thereof convergently to and through a turbulent mixing zone at least partly separated from said body of water but communicating with said body of slurry, then divergently into and through said slurry body and back to said mixing zone; passing incoming water into said mixing zone; introducing a precipitant from the group consisting of soluble iron and aluminum hydroxide-forming compounds; reacting said precipitant with an alkaline material in said water to form solid particles of an insoluble hydroxide in the presence of turbidity-imparting solids, whereby turbidity-imparting solids are united with said hydroxide particles; displacing an output quantity of clarified water from said slurry body by the water and slurry from said mixing zone; maintaining the particles in the circulated slurry in suspension; withdrawing said clarified water from a point above said slurry body; and withdrawing particles of slurry to control the volume of slurry in said body.

WALTER J. HUGHES.